(12) United States Patent
Good et al.

(10) Patent No.: US 7,309,043 B2
(45) Date of Patent: Dec. 18, 2007

(54) ACTUATION DEVICE POSITIONING SYSTEMS AND ASSOCIATED METHODS, INCLUDING AIRCRAFT SPOILER DROOP SYSTEMS

(75) Inventors: Mark S. Good, Seattle, WA (US); Neal V. Huynh, Seattle, WA (US); Kelly T. Jones, Seattle, WA (US); Selya Sakurai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 118 days.

(21) Appl. No.: 11/116,905

(22) Filed: Apr. 27, 2005

(65) Prior Publication Data

US 2007/0176051 A1 Aug. 2, 2007

(51) Int. Cl.
*B64C 9/00* (2006.01)
(52) U.S. Cl. ...................................... 244/99.2
(58) Field of Classification Search .............. 244/99.2, 244/213–216
See application file for complete search history.

(56) References Cited

U.S. PATENT DOCUMENTS

| | | | |
|---|---|---|---|
| 1,724,456 A | 8/1929 | Crook | |
| 1,770,575 A | 7/1930 | Ksoll | |
| 2,086,085 A | 7/1937 | Lachmann et al. | |
| 2,169,416 A | * | 8/1939 | Griswold ............ 244/216 |
| 2,282,516 A | 5/1942 | Hans et al. | |
| 2,289,704 A | 7/1942 | Grant | |
| 2,319,383 A | 5/1943 | Zap | |
| 2,347,230 A | 4/1944 | Zuck | |
| 2,358,985 A | 9/1944 | McAndrew | |
| 2,378,528 A | 6/1945 | Arsandaux | |
| 2,383,102 A | 8/1945 | Zap | |
| 2,385,351 A | 9/1945 | Davidsen | |
| 2,387,492 A | 10/1945 | Blaylock et al. | |
| 2,389,274 A | 11/1945 | Pearsall et al. | |
| 2,406,475 A | 8/1946 | Rogers | |
| 2,422,296 A | 6/1947 | Flader et al. | |

(Continued)

FOREIGN PATENT DOCUMENTS

DE 387 833 1/1924

(Continued)

OTHER PUBLICATIONS

U.S. Appl. No. 11/048,320, Konings.

(Continued)

*Primary Examiner*—Timothy D. Collins
(74) *Attorney, Agent, or Firm*—Perkins Coie LLP

(57) ABSTRACT

Actuation device positioning systems and associated methods, including aircraft spoiler droop systems are generally disclosed herein. One aspect of the invention is directed toward a positioning system that includes an eccentric cam and a drive mechanism coupled to the eccentric cam to rotate the eccentric cam between a first cam position and a second cam position. The system can further include an actuation device having an anchor portion and a movable portion that is movable relative to the anchor portion, the anchor portion operatively coupled to the eccentric cam. The eccentric cam can be positioned to move the anchor portion to a first anchor position when the eccentric cam is rotated to the first cam position and to move the anchor portion to a second anchor position when the eccentric cam is rotated to the second cam position.

25 Claims, 6 Drawing Sheets

U.S. PATENT DOCUMENTS

| | | |
|---|---|---|
| 2,444,293 A | 6/1948 | Holt |
| 2,458,900 A | 1/1949 | Erny |
| 2,504,684 A | 4/1950 | Harper |
| 2,518,854 A | 8/1950 | Badenoch |
| 2,563,453 A | 8/1951 | Briend |
| 2,652,812 A | 9/1953 | Fenzl |
| 2,665,084 A | 1/1954 | Feeney et al. |
| 2,851,229 A | 9/1958 | Clark |
| 2,864,239 A | 12/1958 | Taylor |
| 2,877,968 A | 3/1959 | Granan et al. |
| 2,886,008 A * | 5/1959 | Geyer et al. .................... 91/45 |
| 2,891,740 A | 6/1959 | Campbell |
| 2,892,312 A | 6/1959 | Allen et al. |
| 2,899,152 A | 8/1959 | Weiland |
| 2,912,190 A | 11/1959 | MacDonough |
| 2,920,844 A | 1/1960 | Marshall et al. |
| 2,938,680 A | 5/1960 | Greene et al. |
| 2,990,144 A | 6/1961 | Hougland |
| 2,990,145 A | 6/1961 | Hougland |
| 3,013,748 A | 12/1961 | Westburg |
| 3,089,666 A | 5/1963 | Quenzler |
| 3,102,607 A | 9/1963 | Roberts |
| 3,112,089 A | 11/1963 | Dornier |
| 3,136,504 A | 6/1964 | Carr |
| 3,166,271 A | 1/1965 | Zuck |
| 3,203,275 A * | 8/1965 | Hoover .................. 74/665 GA |
| 3,203,647 A | 8/1965 | Alvarez-Calderon |
| 3,282,535 A * | 11/1966 | Steiner ....................... 244/214 |
| 3,375,998 A | 4/1968 | Alvarez-Calderon |
| 3,423,858 A | 1/1969 | Speno |
| 3,447,763 A | 6/1969 | Allcock |
| 3,463,418 A | 8/1969 | Miksch |
| 3,504,870 A | 4/1970 | Cole et al. |
| 3,528,632 A | 9/1970 | Miles et al. |
| 3,539,133 A | 11/1970 | Robertson |
| 3,556,439 A | 1/1971 | Autry et al. |
| 3,587,311 A | 6/1971 | Hays, Jr. |
| 3,589,648 A | 6/1971 | Gorham et al. |
| 3,642,234 A | 2/1972 | Kamber et al. |
| 3,653,611 A | 4/1972 | Trupp et al. |
| 3,659,810 A | 5/1972 | Robertson |
| 3,677,504 A | 7/1972 | Schwarzler |
| 3,704,828 A | 12/1972 | Studer et al. |
| 3,704,843 A | 12/1972 | Jenny |
| 3,711,039 A | 1/1973 | James |
| 3,730,459 A | 5/1973 | Zuck |
| 3,743,219 A | 7/1973 | Gorges |
| 3,767,140 A | 10/1973 | Johnson |
| 3,794,276 A | 2/1974 | Maltby et al. |
| 3,804,267 A | 4/1974 | Cook et al. |
| 3,807,447 A | 4/1974 | Masuda |
| 3,813,062 A | 5/1974 | Prather |
| 3,827,658 A | 8/1974 | Hallworth |
| 3,831,886 A | 8/1974 | Burdges et al. |
| 3,836,099 A | 9/1974 | O'Neill et al. |
| 3,837,601 A | 9/1974 | Cole |
| 3,862,730 A | 1/1975 | Heiney |
| 3,874,617 A | 4/1975 | Johnson |
| 3,897,029 A | 7/1975 | Calderon |
| 3,904,152 A | 9/1975 | Hill |
| 3,910,530 A | 10/1975 | James et al. |
| 3,913,450 A | 10/1975 | MacGregir |
| 3,917,192 A | 11/1975 | Alvarez-Calderon |
| 3,931,374 A | 1/1976 | Moutet et al. |
| 3,941,334 A | 3/1976 | Cole |
| 3,941,341 A | 3/1976 | Brogdon, Jr. |
| 3,949,957 A | 4/1976 | Portier et al. |
| 3,968,946 A | 7/1976 | Cole |
| 3,985,319 A | 10/1976 | Dean et al. |
| 3,987,983 A | 10/1976 | Cole |
| 3,991,574 A | 11/1976 | Frazier |
| 3,992,979 A | 11/1976 | Smith |
| 3,993,584 A | 11/1976 | Owen et al. |
| 3,994,451 A | 11/1976 | Cole |
| 4,011,888 A | 3/1977 | Whelchel et al. |
| 4,015,787 A | 4/1977 | Maieli et al. |
| 4,106,730 A | 8/1978 | Spitzer et al. |
| 4,117,996 A | 10/1978 | Sherman |
| 4,120,470 A | 10/1978 | Whitener |
| 4,131,253 A | 12/1978 | Zapel |
| 4,146,200 A | 3/1979 | Borzachillo |
| 4,171,787 A | 10/1979 | Zapel |
| 4,180,222 A | 12/1979 | Thornburg |
| 4,181,275 A | 1/1980 | Moelter et al. |
| 4,189,120 A | 2/1980 | Wang |
| 4,189,121 A | 2/1980 | Harper et al. |
| 4,189,122 A | 2/1980 | Miller |
| 4,200,253 A | 4/1980 | Rowarth |
| 4,202,519 A | 5/1980 | Fletcher |
| 4,240,255 A | 12/1980 | Benilan |
| 4,262,868 A | 4/1981 | Dean |
| 4,267,990 A | 5/1981 | Staudacher et al. |
| 4,275,942 A | 6/1981 | Steidl |
| 4,283,029 A | 8/1981 | Rudolph |
| 4,285,482 A | 8/1981 | Lewis |
| 4,293,110 A | 10/1981 | Middleton |
| 4,312,486 A | 1/1982 | McKinney |
| 4,351,502 A | 9/1982 | Statkus |
| 4,353,517 A | 10/1982 | Rudolph |
| 4,358,077 A | 11/1982 | Coronel |
| 4,360,176 A | 11/1982 | Brown |
| 4,363,098 A | 12/1982 | Buus et al. |
| 4,365,774 A | 12/1982 | Coronel |
| 4,368,937 A | 1/1983 | Palombo et al. |
| 4,384,693 A | 5/1983 | Pauly |
| 4,427,168 A | 1/1984 | McKinney |
| 4,441,675 A | 4/1984 | Boehringer |
| 4,444,368 A | 4/1984 | Andrews |
| 4,448,375 A | 5/1984 | Herndon |
| 4,459,084 A | 7/1984 | Clark |
| 4,461,449 A | 7/1984 | Turner |
| 4,471,925 A | 9/1984 | Kunz et al. |
| 4,471,927 A | 9/1984 | Rudolph |
| 4,472,780 A | 9/1984 | Chenoweth et al. |
| 4,475,702 A | 10/1984 | Cole |
| 4,479,620 A | 10/1984 | Rogers et al. |
| 4,485,992 A | 12/1984 | Rao |
| 4,496,121 A | 1/1985 | Berlin |
| 4,498,646 A | 2/1985 | Proksch |
| 4,528,775 A | 7/1985 | Einarsson |
| 4,533,096 A | 8/1985 | Baker |
| 4,542,869 A | 9/1985 | Brine |
| 4,544,117 A | 10/1985 | Schuster |
| 4,553,722 A | 11/1985 | Cole |
| 4,575,030 A | 3/1986 | Gratzer |
| 4,575,099 A | 3/1986 | Nash |
| 4,576,347 A | 3/1986 | Opsahl |
| 4,605,187 A | 8/1986 | Stephenson |
| 4,637,573 A | 1/1987 | Perin |
| 4,650,140 A | 3/1987 | Cole |
| 4,691,879 A | 9/1987 | Greene |
| 4,700,911 A | 10/1987 | Zimmer |
| 4,702,441 A | 10/1987 | Wang |
| 4,702,442 A | 10/1987 | Weiland et al. |
| 4,706,913 A | 11/1987 | Cole |
| 4,712,752 A | 12/1987 | Victor |
| 4,717,097 A | 1/1988 | Sepstrup |
| 4,720,066 A | 1/1988 | Renken et al. |
| 4,729,528 A | 3/1988 | Borzachillo |
| 4,747,375 A * | 5/1988 | Williams ................. 123/90.15 |
| 4,784,355 A | 11/1988 | Brine |
| 4,786,013 A | 11/1988 | Pohl |
| 4,789,119 A | 12/1988 | Bellego et al. |
| 4,796,192 A | 1/1989 | Lewis |

| | | | | | |
|---|---|---|---|---|---|
| 4,823,836 A | 4/1989 | Bachmann et al. | 6,293,497 B1 | 9/2001 | Kelley-Wickemeyer |
| 4,838,503 A | 6/1989 | Williams et al. | 6,328,265 B1 | 12/2001 | Dizdarevic |
| 4,854,528 A | 8/1989 | Hofrichter et al. | 6,349,798 B1 | 2/2002 | McKay |
| 4,856,735 A | 8/1989 | Lotz | 6,349,903 B2 | 2/2002 | Caton et al. |
| 4,867,394 A | 9/1989 | Patterson, Jr. et al. | 6,364,254 B1 | 4/2002 | May |
| 4,892,274 A | 1/1990 | Pohl et al. | 6,375,126 B1 | 4/2002 | Sakurai |
| 4,899,284 A | 2/1990 | Lewis | 6,382,566 B1 | 5/2002 | Ferrel et al. |
| 4,962,902 A | 10/1990 | Fortes | 6,431,498 B1 | 8/2002 | Watts et al. |
| 5,039,032 A | 8/1991 | Rudolph | 6,439,512 B1 | 8/2002 | Hart |
| 5,046,688 A | 9/1991 | Woods | 6,443,394 B1 | 9/2002 | Weisend |
| 5,050,081 A | 9/1991 | Abbott et al. | 6,450,457 B1 | 9/2002 | Sharp |
| 5,056,741 A | 10/1991 | Bliesner et al. | 6,464,175 B2 | 10/2002 | Yada et al. |
| 5,074,495 A | 12/1991 | Raymond | 6,466,141 B1 | 10/2002 | McKay et al. |
| 5,082,208 A | 1/1992 | Matich | 6,478,541 B1 | 11/2002 | Charles et al. |
| 5,088,665 A | 2/1992 | Vijgen | 6,481,667 B1 | 11/2002 | Ho |
| 5,094,411 A | 3/1992 | Rao | 6,484,969 B2 | 11/2002 | Sprenger |
| 5,094,412 A | 3/1992 | Narramore | 6,499,577 B2 | 12/2002 | Kitamoto et al. |
| 5,100,082 A | 3/1992 | Archung | 6,536,714 B2 | 3/2003 | Gleine et al. |
| 5,114,100 A | 5/1992 | Rudolph | 6,547,183 B2 | 4/2003 | Farnsworth |
| 5,129,597 A | 7/1992 | Manthey | 6,554,229 B1 | 4/2003 | Lam |
| 5,158,252 A | 10/1992 | Sakurai | 6,561,463 B1 | 5/2003 | Yount et al. |
| 5,167,383 A | 12/1992 | Nozaki | 6,591,169 B2 | 7/2003 | Jones |
| 5,203,619 A | 4/1993 | Welsch | 6,598,829 B2 | 7/2003 | Kamstra |
| 5,207,400 A | 5/1993 | Jennings | 6,598,834 B2 | 7/2003 | Nettle |
| 5,244,269 A | 9/1993 | Harriehausen | 6,601,801 B1 | 8/2003 | Prow |
| 5,259,293 A | 11/1993 | Brunner | 6,622,972 B2 | 9/2003 | Urnes |
| 5,280,863 A | 1/1994 | Schmittle | 6,625,982 B2 | 9/2003 | Van Den Bossche |
| 5,282,591 A | 2/1994 | Walters et al. | 6,644,599 B2 | 11/2003 | Perez |
| 5,351,914 A | 10/1994 | Nagao | 6,651,930 B1 | 11/2003 | Gautier et al. |
| 5,388,788 A | 2/1995 | Rudolph | 6,729,583 B2 | 5/2004 | Milliere et al. |
| 5,420,582 A | 5/1995 | Kubbat | 6,745,113 B2 | 6/2004 | Griffin |
| 5,441,218 A | 8/1995 | Mueller | 6,755,375 B2 | 6/2004 | Trikha |
| 5,474,265 A | 12/1995 | Capbern | 6,796,534 B2 | 9/2004 | Beyer et al. |
| 5,493,497 A | 2/1996 | Buus | 6,799,739 B1 | 10/2004 | Jones |
| 5,535,852 A | 7/1996 | Bishop | 6,802,475 B2 | 10/2004 | Davies et al. |
| 5,542,684 A | 8/1996 | Squirrell | 6,824,099 B1 | 11/2004 | Jones |
| 5,544,847 A | 8/1996 | Bliesner | 6,843,452 B1 | 1/2005 | Vassberg et al. |
| 5,564,655 A | 10/1996 | Garland et al. | 6,860,452 B2 | 3/2005 | Bacon et al. |
| 5,600,220 A | 2/1997 | Thoraval | 6,870,490 B2 | 3/2005 | Sherry et al. |
| 5,609,020 A | 3/1997 | Jackson | 6,978,971 B1 | 12/2005 | Speer |
| 5,680,124 A | 10/1997 | Bedell | 6,981,676 B2 | 1/2006 | Milliere |
| 5,681,014 A | 10/1997 | Davies et al. | 7,007,897 B2 | 3/2006 | Wingett et al. |
| 5,686,907 A | 11/1997 | Bedell | 7,028,948 B2 | 4/2006 | Pitt |
| 5,735,485 A | 4/1998 | Ciprian et al. | 7,048,228 B2 | 5/2006 | Vassberg et al. |
| 5,740,991 A | 4/1998 | Gleine | 7,048,234 B2 | 5/2006 | Reeksiek et al. |
| 5,743,490 A | 4/1998 | Gillingham | 7,048,235 B2 | 5/2006 | McLean et al. |
| 5,788,190 A | 8/1998 | Siers | 7,051,982 B1 | 5/2006 | Johnson |
| 5,839,698 A | 11/1998 | Moppert | 7,059,563 B2 | 6/2006 | Huynh |
| 5,875,998 A | 3/1999 | Gleine | 2002/0046087 A1 | 4/2002 | Hey |
| 5,915,653 A | 6/1999 | Koppelman | 2002/0074459 A1 | 6/2002 | Gleine et al. |
| 5,921,506 A | 7/1999 | Appa | 2002/0100842 A1 | 8/2002 | Perez |
| 5,927,656 A | 7/1999 | Hinkleman | 2002/0184885 A1 | 12/2002 | Blot-Carretero et al. |
| 5,934,615 A | 8/1999 | Treichler | 2003/0058134 A1 | 3/2003 | Sherry |
| 5,978,715 A | 11/1999 | Briffe | 2003/0127569 A1 | 7/2003 | Bacon et al. |
| 5,984,230 A | 11/1999 | Drazi | 2003/0132860 A1 | 7/2003 | Feyereisien |
| 6,015,117 A | 1/2000 | Broadbent | 2003/0197097 A1 | 10/2003 | Wakayama |
| 6,033,180 A | 3/2000 | Machida et al. | 2004/0004162 A1 | 1/2004 | Beyer |
| 6,045,204 A | 4/2000 | Frazier | 2004/0016556 A1 | 1/2004 | Barber |
| 6,073,624 A | 6/2000 | Laurent | 2004/0046087 A1 | 3/2004 | Beyer et al. |
| 6,076,767 A | 6/2000 | Farley et al. | 2004/0059474 A1 | 3/2004 | Boorman |
| 6,076,776 A | 6/2000 | Breitbach | 2004/0195464 A1 | 10/2004 | Vassberg et al. |
| 6,079,672 A | 6/2000 | Lam et al. | 2004/0217575 A1 | 11/2004 | Beaujot et al. |
| 6,082,679 A | 7/2000 | Crouch et al. | 2004/0245386 A1 | 12/2004 | Huynh |
| 6,109,567 A | 8/2000 | Munoz | 2005/0011994 A1 | 1/2005 | Sakurai et al. |
| 6,145,791 A | 11/2000 | Diller et al. | 2005/0017126 A1 | 1/2005 | McLean et al. |
| 6,152,405 A | 11/2000 | Muller et al. | 2005/0061922 A1 | 3/2005 | Milliere |
| 6,161,801 A | 12/2000 | Kelm | 2005/0109876 A1 | 5/2005 | Jones |
| 6,164,598 A | 12/2000 | Young et al. | 2005/0151028 A1 | 7/2005 | Pohl et al. |
| 6,173,924 B1 | 1/2001 | Young et al. | 2005/0224662 A1 | 10/2005 | Lacy |
| 6,189,837 B1 | 2/2001 | Matthews | 2005/0242234 A1 | 11/2005 | Mahmulyin |
| 6,213,433 B1 | 4/2001 | Gruensfelder | 2005/0274847 A1 | 12/2005 | Charron |
| 6,227,498 B1 | 5/2001 | Arata | 2006/0000952 A1 | 1/2006 | Rampton et al. |
| 6,244,542 B1 | 6/2001 | Young et al. | 2006/0038086 A1 | 2/2006 | Reckzeh |

| | | | |
|---|---|---|---|
| 2006/0049308 | A1 | 3/2006 | Good et al. |
| 2006/0102803 | A1 | 5/2006 | Wheaton et al. |
| 2006/0226297 | A1 | 10/2006 | Perez-Sanchez |
| 2006/0245882 | A1 | 11/2006 | Khan et al. |

FOREIGN PATENT DOCUMENTS

| | | |
|---|---|---|
| DE | 11 29 379 | 5/1962 |
| EP | 0100775 A1 | 2/1984 |
| EP | 0 103 038 | 3/1984 |
| EP | 0 215 211 | 3/1987 |
| EP | 0 483 504 A1 | 5/1992 |
| EP | 0781704 A1 | 2/1997 |
| EP | 0 947 421 | 10/1999 |
| EP | 1010616 | 6/2000 |
| EP | 1338506 | 8/2003 |
| EP | 1 462 361 | 9/2004 |
| EP | 1 547 917 A1 | 6/2005 |
| FR | 705155 | 6/1931 |
| FR | 984 443 | 7/1951 |
| FR | 56121 | 9/1952 |
| FR | 57 988 | 9/1953 |
| FR | 58273 | 11/1953 |
| GB | 1 181 991 | 2/1970 |
| GB | 2 144 688 A | 3/1985 |

OTHER PUBLICATIONS

U.S. Appl. No. 09/714,026, filed Nov. 16, 2000, Sakurai.
U.S. Appl. No. 09/921,212, filed Aug. 2, 2001, Farnsworth.
U.S. Appl. No. 10/454,417, Neal V. Huynh.
U.S. Appl. No. 10/671,435, Robert Kelley-Wickemeyer.
U.S. Appl. No. 10/746,883, Boorman.
U.S. Appl. No. 10/746,912, Boorman.
U.S. Appl. No. 10/770,256, Speer.
U.S. Appl. No. 10/787,644, Tafs et al.
U.S. Appl. No. 10/789,100, Lacy et al.
U.S. Appl. No. 10/798,749, Sandell et al.
U.S. Appl. No. 10/814,369, Chen et al.
U.S. Appl. No. 10/814,494, Gunn et al.
U.S. Appl. No. 10/815,034, Crane et al.
U.S. Appl. No. 10/868,234, Rampton et al.
U.S. Appl. No. 10/868,238, Dun.
U.S. Appl. No. 10/935,846, Good et al.
U.S. Appl. No. 10/955,686, Wheaton et al.
U.S. Appl. No. 10/959,629, Jones.
U.S. Appl. No. 11/051,738, Huynh et al.
U.S. Appl. No. 60/475,828, Whitener.
777 High Lift System, 777 Maintenance Manual, Publication Date: Circa 1994 (1 page).
777 Transmission—Typical, 777 Maintenance Manual, Publication Date: Circa 1994 (1 page).
A320 Hinterkantem-Klappen-Verstell System, Trailing Edge Flap System, SAE Presentation, Publication Date: Circa 1990 (1 page).
A340 Flight Controls, SAE Presentation, Publication Date: Circa 1995 (1 page).
Boeing, 777 Aircraft Maintenance Manual, Sep. 5, 2002 (p. 39).

Drela, M., "Optimization Techniques in Airfoil Design," MIT Aero & Astro, 29 pages.
Drela, Mark, "Design and Optimization Method for Multi-Element Airfoils," MIT Department of Aeronautics and Astronautics, Copyright 1993 American Institute of Aeronautics and Astronautics, Inc. (pp. 1-11).
European Search Report for European Patent Application No. EP 03 07 7840, The Boeing Company, Nov. 4, 2003 (2 pgs).
Flap Drive System, 777 Maintenance Manual, Publication Date: Circa 1994 (1 page).
Flap Transmission and Support, 777 Maintenance Manual, Publication Date: Circa 1994 (1 page).
Hansen, H., "Application of Mini-Trailing-Edge Devices in the Awiator Project," Airbus Deutschland, EGAG, Hunefeldstr. 1-5, D-28199 Bremen, Germany, 9 pages.
International Search Report, PCT/US03/19724/ Sep. 11, 2003, 5 pages.
Junkers JU 52/3M (2 pages); http://www.wpafb.af.mil/museum/outdoor/od16; [Accessed Aug. 7, 2003].
Moog, Component Maintenance Manual, May 1994 (2 pgs).
Niu, Chen-Yen, Airframe Structural Design, Chen-Yeun Niu, Conmilit Press, 1988 (1 page).
Petrov, A.V., "Certain Types of Separated Flow over Slotted Wings," Fluid Mechanics—Soviet Research, vol. 7, No. 5, Sep.-Oct. 1978.
The High Speed Frontier, Chapter 2: The High-Speed Airfoil Program, "Supercritical" Airfoils, 1957-1978 (4 pages); http://www.hq.nasa.gov/office/pao/History/SP-445/ch2-5.
TU 1-44 Canard, 1 pg, date unknown.
Whitcomb, Richard T., "Review of NASA Supercritical Airfoils," National Aeornautics and Space Administration, Aug. 1974 (pp. 8-18).
"Adaptive Aircraft: No Flight of Fancy?" Research into using exotic means of making wings change shpe in-flight looks promising, though still a long way from reality, Business Week Online, Jan. 7, 2003, pp. 1-3.
"Aero-Space Research & Technology," Space Systems, Sep. 1, 2001, pp. 1-28.
"Flap (aircraft)", Wikipedia, The Free Encyclopedia, Aug. 3, 2006, 10:18 UTC. Wikimedia Foundation, Inc. Aug. 5, 2006; http://wn.wikipedia.org/index.pho?title=Flap_%28aircraft%29&oldid=67413665>.
"Morphing aircraft Structure," —Penn State University, www.personal.psu.edu/users/d/s/dsr134/mas/Cellular.htm, pp. 1-3.
"Morphing Aircraft Structures," —Raytheon, www.defense-update.com, pp. 1-3.
"Slats.", Wikipedia, The Free Encyclopedia. Jun. 27, 2006, 12:323 UTC. Wikimedia Foundation, Inc. Aug. 5, 2006; http:wn.wikipedia.org/w/index.php?title=Slats&oldid=60827639>.
Leaf Spring Retainer Seals; EMP, Inc.; 2 pgs.
Morphing Systems, "Morphing Aerostructures-An Overview," www.crgrp.net/morphingsystems.htm< http://www.crgrp.net/morphingsystems.htm>, pp. 1-9, [Accessed Aug. 31, 2005].

* cited by examiner

ACTUATION DEVICE POSITIONING SYSTEMS AND ASSOCIATED METHODS, INCLUDING AIRCRAFT SPOILER DROOP SYSTEMS

TECHNICAL FIELD

Embodiments of the present invention relate to actuation device positioning systems and associated methods, including aircraft spoiler droop systems.

BACKGROUND

Current commercial transport aircraft typically include deployable high lift devices that change the aircraft wing shape depending on fight conditions. These devices can include leading edge flaps and/or slats, and trailing edge flaps that are extended to increase lift during takeoff and landing. In some cases, it has been contemplated to move these devices using eccentric cams, as disclosed in U.S. Pat. No. 6,802,475, issued Oct. 12, 2004, which is fully incorporated herein by reference. During cruise flight, these devices can be retracted to reduce aircraft drag. Commercial transport aircraft can also include spoilers to selectively reduce lift and/or increase drag during various phases of operation (e.g., descent, landing, and aborted takeoffs). On some aircraft, spoilers can be used to provide roll control of the aircraft.

FIG. 1 is a partially schematic cross-sectional illustration of a wing 92 with a spoiler 94 and a flap 96 in a retracted position configured in accordance with the prior art. FIG. 2 is a partially schematic cross-sectional illustration of the wing 92 shown in FIG. 1 with the flap 96 in an extended position. The flap 96 is coupled to a support 75 via a first flap link 71. A drive mechanism 10 is connected via a torque tube 97 to a flap drive unit 50. The flap 96 is operatively connected to the flap drive unit 50 via the first flap link 71, a second flap link 72, and a lever 73. The flap drive unit 50 is configured to move the lever 73, causing the first flap link 71 to pivot about point B and move the flap 96 between the retracted and extended positions shown in FIGS. 1 and 2 respectively. In the extended position, a gap is created between the trailing edge of the spoiler 94 and the leading edge of the extended flap 96 allowing a first airflow F1 to be energized by the second airflow F2 that flows through the gap.

As the flap 96 moves from the retracted position (shown in FIG. 1) to the extended position (shown in FIG. 2), a first interconnect link 61 causes a second interconnect link 62 to pivot about a fixed point C, moving the spoiler actuator 30 and causing the spoiler 94 to droop (e.g., causing the spoiler 94 to rotate about point A with the trailing edge of the spoiler 94 moving toward the leading edge of the extended flap 96). This spoiler droop can improve airflow (e.g., airflow F1 and airflow F2) proximate to the wing 92, and the extended flap 96 as compared to when the spoiler 94 is not drooped. This improved airflow can improve overall performance of the wing 92 by increasing lift, decreasing drag, and/or improving high angle of attack characteristics.

A problem with this configuration is that the first and second interconnect links 61, 62 can be required to span significant distances, adding weight and complexity to the flap and spoiler systems. Another problem is that at least a portion of the first and/or second interconnect links 61, 62 are required to extend into the cove area 65 where the flap support 75 and the first flap link 71 are located. Accordingly, when the flap 96 is extended, the portions of the first and/or second interconnect links 61, 62 can interfere with the second airflow F2 through the gap between the spoiler 94 in the flap 96 proximate to the cove area 65, reducing the performance benefits provided by the gap. Yet another problem with this configuration is that the spoiler actuator 30 must be positioned proximate to the flap drive unit 50, support 75, and first flap link 71, which can result in the spoiler actuator 30 being positioned at a less than desirable location. For example, in certain situations, the spoiler actuators 30 must be positioned away from the center of the spoilers 94 or multiple spoiler actuators 30 must be attached to the spoilers 94 asymmetrically.

SUMMARY

The present invention is directed generally toward actuation device positioning systems and associated methods, including aircraft spoiler droop systems. One aspect of the invention is directed toward a positioning system that includes an eccentric cam and a drive mechanism coupled to the eccentric cam to rotate the eccentric cam between a first cam position and a second cam position. The system can further include an actuation device having an anchor portion and a movable portion that is movable relative to the anchor portion, the anchor portion operatively coupled to the eccentric cam. The eccentric cam can be positioned to move the anchor portion to a first anchor position when the eccentric cam is rotated to the first cam position and to move the anchor portion to a second anchor position when the eccentric cam is rotated to the second cam position. In a further aspect of the invention, the system can also include a first control surface coupled to the actuation device and a second control surface coupled to the drive mechanism. The drive mechanism can be arranged to move the second control surface while rotating the eccentric cam between the first cam position and the second cam position.

Another aspect of the invention is directed toward a method for making a positioning system that includes coupling a drive mechanism to an eccentric cam to rotate the eccentric cam between a first cam position and a second cam position. The method can further include coupling an anchor portion of an actuation device to the eccentric cam. The eccentric cam can be positioned to move the anchor portion to a first anchor position when the eccentric cam is rotated to the first cam position and to move the anchor portion to a second anchor position when the eccentric cam is rotated to the second cam position. The actuation device can have a movable portion that is movable relative to the anchor portion.

Still another aspect of the invention is directed toward a method for positioning an actuation device that includes rotating an eccentric cam with a drive mechanism between a first cam position and a second cam position. An anchor portion of the actuation device can be coupled to the eccentric cam so that the anchor portion of the actuation device moves to a first anchor position when the eccentric cam is rotated to the first cam position. The anchor portion of the actuation device can also be coupled to the eccentric cam so that the anchor portion of the actuation device moves to a second anchor position when the eccentric cam is rotated to the second cam position. The method can further include moving a movable portion of the actuation device relative to the anchor portion.

DETAILED DESCRIPTION

The present disclosure describes actuation device positioning systems and associated methods, including aircraft spoiler droop systems. Several specific details of the invention are set forth in the following description and in FIGS. 1-8 to provide a thorough understanding of certain embodiments of the invention. One skilled in the art, however, will understand that the present invention may have additional embodiments, and that other embodiments of the invention may be practiced without several of the specific features described below. For example, although embodiments of the present invention are illustrated using an aircraft spoiler droop system, it is understood that other embodiments could include other types of actuators, surfaces, components, and/or vehicles.

Figure 1:
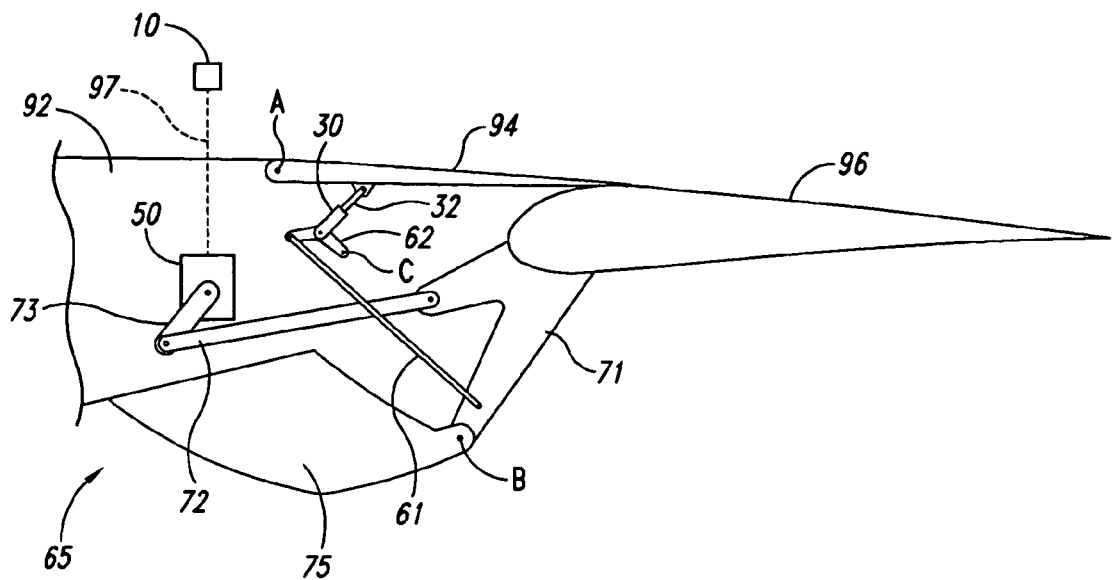
FIG. 1 is a partially schematic cross-sectional illustration of an airfoil with a spoiler and a flap in a retracted position configured in accordance with the prior art.
Figure 2:
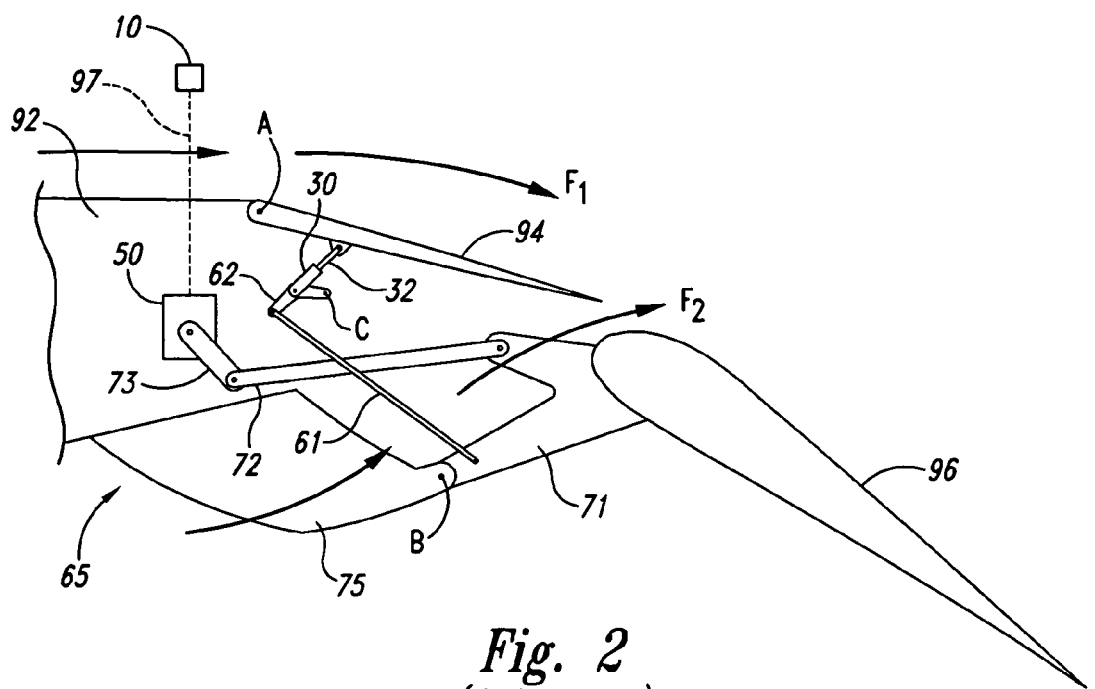
FIG. 2 is a partially schematic cross-sectional illustration of the airfoil shown in FIG. 1 with the flap in the extended position.
Figure 3:
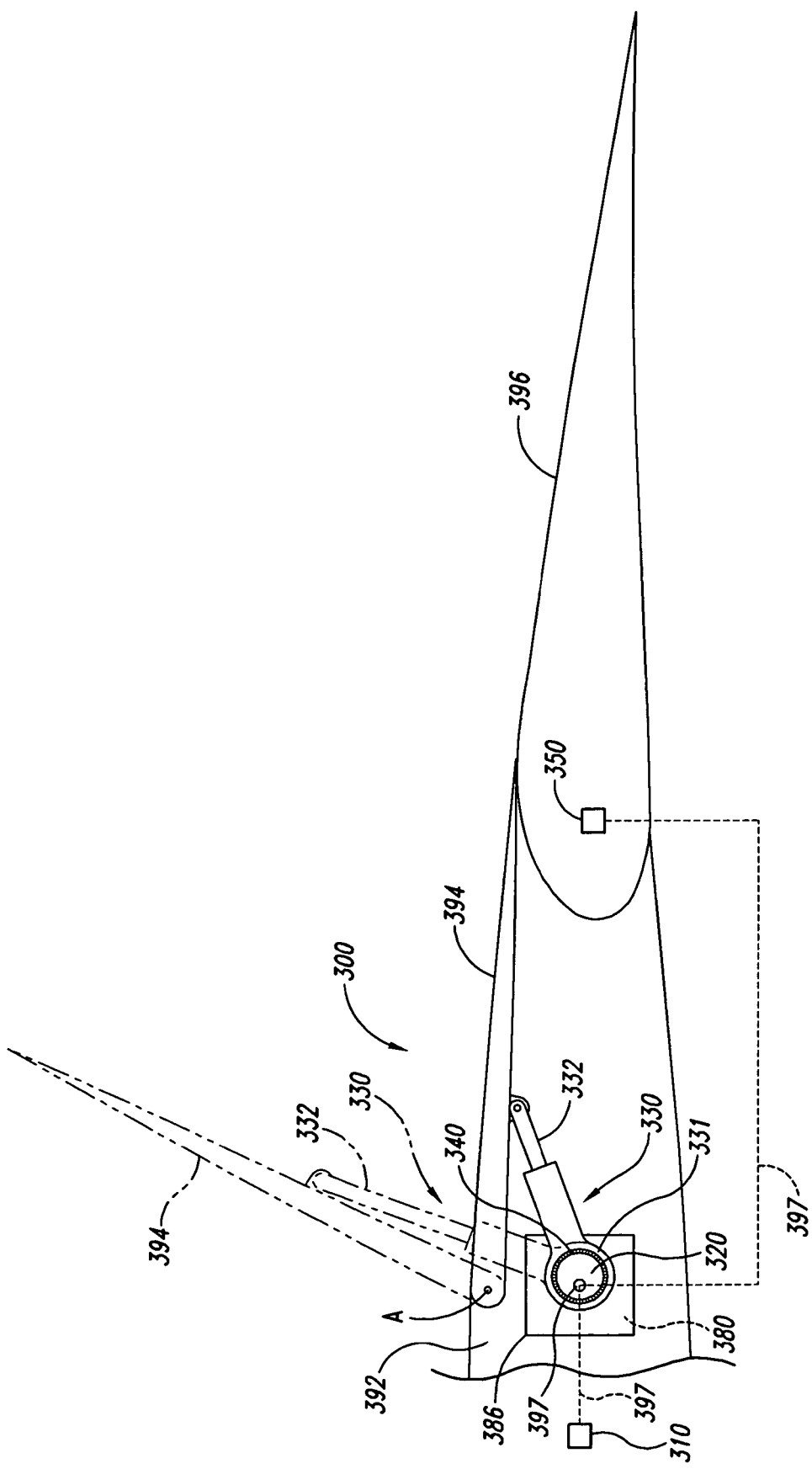
FIG. 3 is a partially schematic cross-sectional illustration of a positioning system that includes a drive mechanism coupled to an actuation device via a gearing arrangement and an eccentric cam. The actuation device is coupled to a first control surface and the drive mechanism is also coupled to a second control surface shown in a first position, in accordance with embodiments of the invention.

FIG. 3 is a partially schematic cross-sectional illustration of a positioning system 300 that includes a drive mechanism 310 coupled to an anchor portion 331 of an actuation device 330 via a coupling element 397 (e.g., a torque tube), a gearing arrangement 380 that can be at least partially contained in a housing 386, and an eccentric cam 320. In the illustrated embodiment, the actuation device 330 includes a movable portion 332 that is movable relative to the anchor portion 331 of the actuation device 330 (e.g., moved by an actuator in the actuation device 330). The movable portion 332 of the actuation device 330 is also coupled to a first control surface 394 (e.g., a spoiler surface on an airfoil 392). The drive mechanism 310 can be configured to rotate the eccentric cam 320 between at least two stationary positions, including a first cam position (shown in FIG. 3) and a second cam position (shown in FIG. 4). The eccentric cam 320 can be positioned to move the anchor portion 331 of the actuation device 330 to a first anchor position (shown in FIG. 3) when the eccentric cam 320 is rotated to the first cam position and to a second anchor position (shown in FIG. 4) when the eccentric cam 320 is rotated to the second cam position. As the anchor portion 331 of the actuation device 330 moves between the first and second anchor positions, the first control surface 394 also moves. For example, as discussed in further detail below, in certain embodiments the drive mechanism 310 can be coupled to a second control surface 396 (e.g., a flap surface on the airfoil 392) via a coupling element 397 and a drive unit 350 (e.g., similar to the flap drive arrangement shown in FIGS. 1 and 2), and the positioning system 300 can be used to droop the first control surface (e.g., a spoiler surface) as the second control surface (e.g., a flap surface) moves from a first position to a second position.

In certain embodiments, the actuation device 330 can be positioned to move the first control surface 394 between at least two positions relative to the anchor portion 331 of the actuation device 330. For example, in FIG. 3 the actuation device 330 and the first control surface 394 are shown by solid lines in a retracted position. As the actuation device 330 extends, the actuation device 330 causes the control surface 394 to rotate about point A and move to an extended position. In FIG. 3, the actuation device 330 and the first control surface 394 are shown in the extended position by ghosted lines. In certain embodiments, the actuation device 330 can move the first control surface 394 between at least two positions relative to the anchor portion 331 of the actuation device 330 when the anchor portion 331 is moved to other positions. For example, as the eccentric cam 320 rotates and moves the anchor portion 331 of the actuation device 330 to the second anchor position, the actuation device 330 can still move the control surface 394 between at least two positions relative to the anchor portion 331. Although in the illustrated embodiment, the actuation device 330 is shown as a linear actuation device (e.g., where the movable portion 332 moves linearly relative to the anchor portion 331), in other embodiments the actuation device can include other types of actuation devices. For example, in other embodiments the actuation device can include a rotary actuation device. Additionally, in various embodiments the actuation device can include various types of actuators, including one or more electrical, hydraulic, mechanical, and/or pneumatic actuators.

In the illustrated embodiment, the drive mechanism 310 rotates the coupling element 397, which in turn imparts rotational motion to the gearing arrangement 380. The gearing arrangement 380 imparts rotational motion to the eccentric cam 320. The coupling element 397 extends through the gearing arrangement 380 and/or the eccentric cam 320, and can be coupled to other elements (e.g., a drive unit 350, another gearing arrangement, and/or another eccentric cam). In the illustrated embodiment, the center of rotation of the eccentric cam is at least approximately coincidental with the coupling element's center of rotation.

Figure 4:
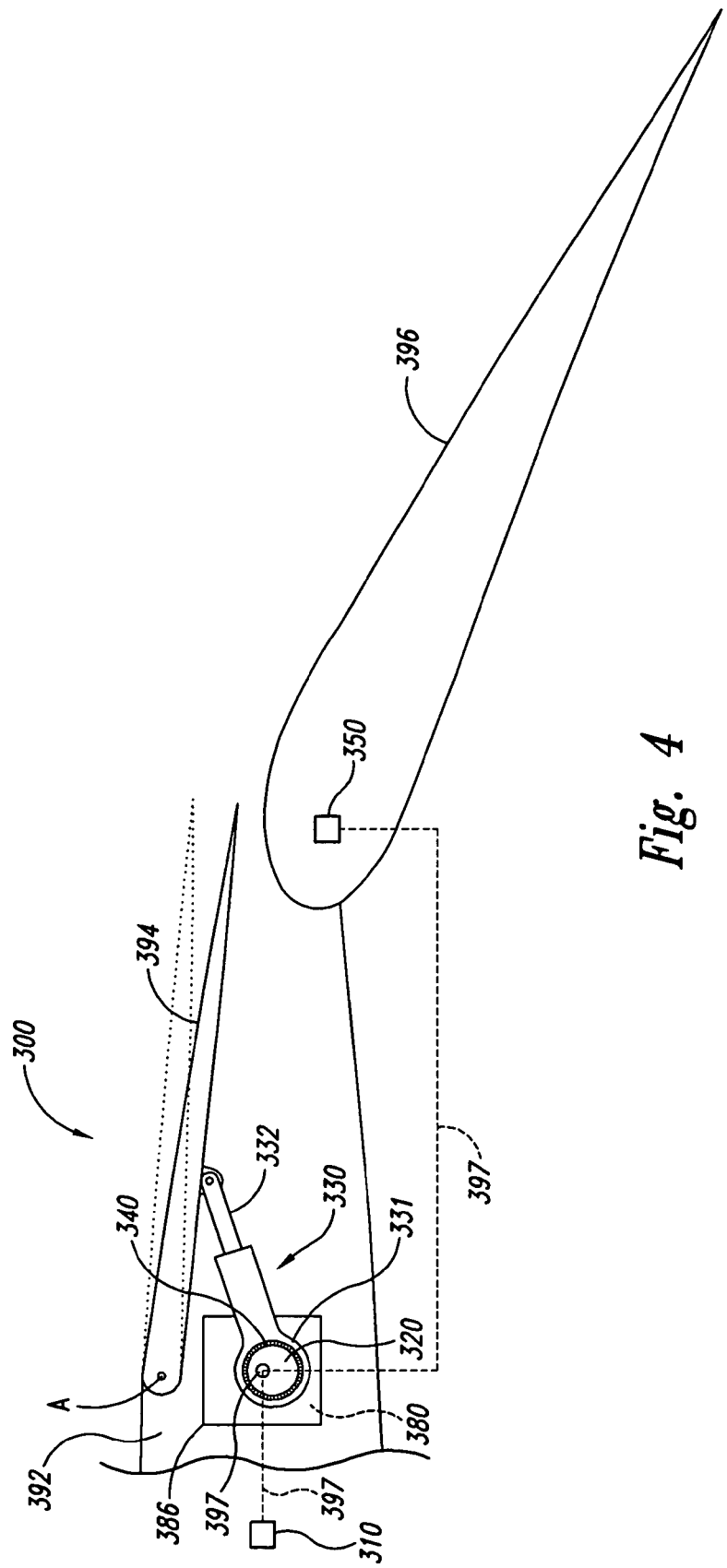
FIG. 4 is a partially schematic cross-sectional illustration of the positioning system shown in FIG. 3 with the second control surface in a second position.
Figure 5:
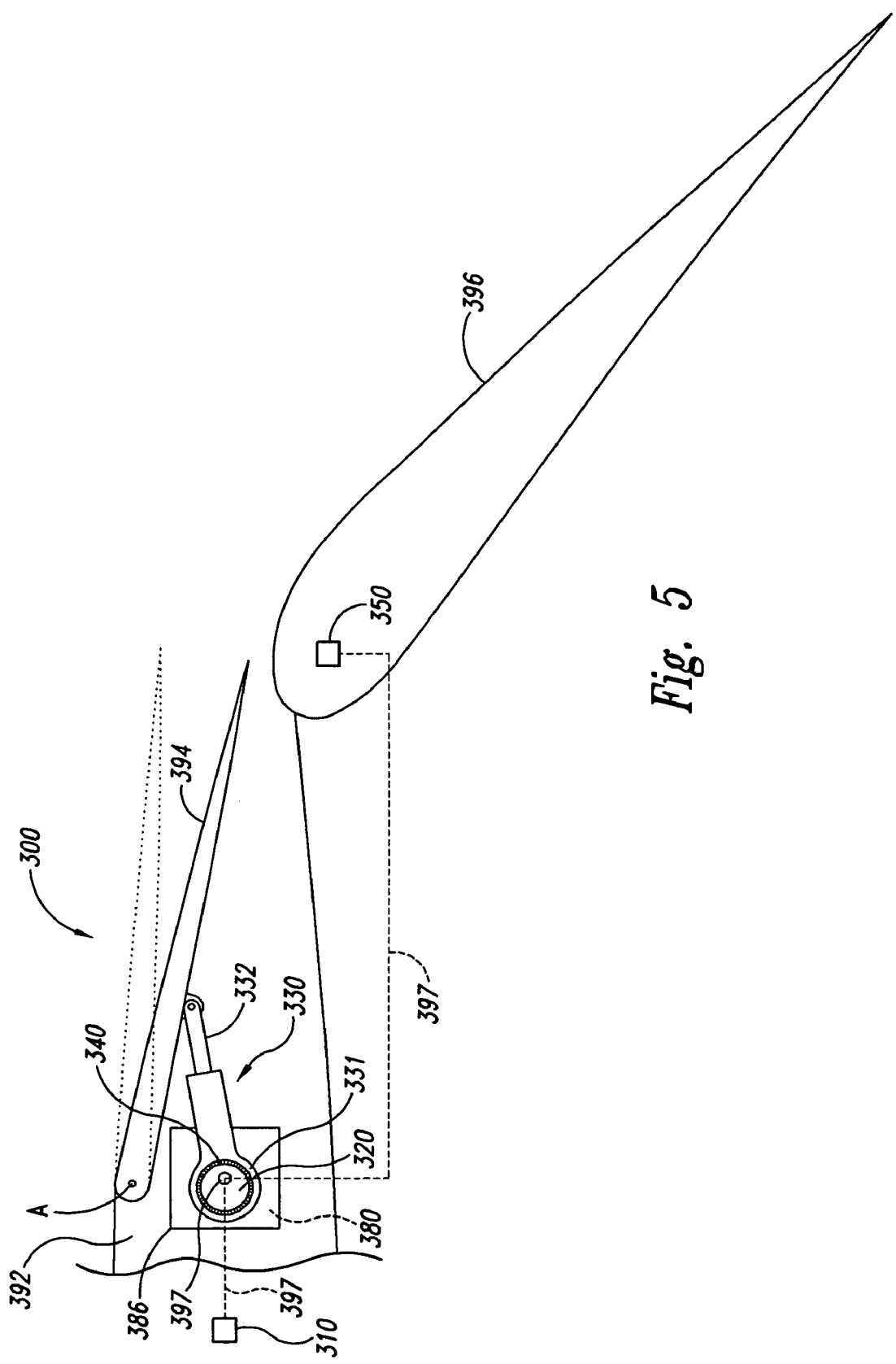
FIG. 5 is a partially schematic cross-sectional illustration of the positioning system shown in FIG. 3 with a second control surface in a third position.

As the eccentric cam 320 rotates from the first cam position shown in FIG. 3, to the second cam position shown in FIG. 4, the eccentric 320 rotates inside of the anchor portion 331 of the actuation device 330. Because the center of rotation of the eccentric cam is not co-located with the geometric center of the eccentric cam, the anchor portion 331 is moved to the second anchor position when the eccentric cam 320 rotates to the second cam position. Correspondingly, the first control surface 394 is moved from a first position (e.g., a first spoiler position) shown by dotted lines, and also shown in FIG. 3, to a second position (e.g., a second spoiler position) shown by solid lines. In the illustrated embodiment, as the eccentric cam 320 rotated from the first cam position to the second cam position, the second control surface 396 has also been moved from a first position (e.g., a first flap position), shown in FIG. 3, to a second position (e.g., a second flap position), shown in FIG. 4. Accordingly, this arrangement can be used to droop a spoiler surface when extending a flap surface to improve airflow proximate to an airfoil on an aircraft. The elliptical motion/operation of an eccentric cam is well known in the art and it is understood that in other embodiments, the eccentric cam 320 can have other shapes and/or the anchor portion 331 can be coupled to the eccentric cam 320 via other arrangements.

In certain embodiments, the eccentric cam 320 can be rotated to multiple cam positions, thereby moving the anchor portion 331 of the actuation device 330 to multiple anchor positions. For example, in FIG. 5 the eccentric cam 320 has been rotated to a third cam position as the second control surface 396 has been moved to a third position (e.g., a third flap position). Correspondingly, the anchor portion 331 of the actuation device 330 has been moved to a third anchor position and has caused the first control surface 394 to move to a third position (e.g., a third spoiler position). For the purpose of illustration, the first position of the first control surface 394 is shown by dotted lines in FIG. 5. As discussed above, in certain embodiments, while the anchor portion 331 of the actuation device 330 is in the third anchor position, the actuation device 330 can move the first control surface 394 between at least two positions relative to the anchor portion 331 (e.g., retracted and extended positions). Also, in certain embodiments the eccentric cam 320 can be positioned to mechanically reduce the amount of back drive force transmitted from air loads on the first control surface 394 to the gearing arrangement 380, the coupling element 397, and/or the drive mechanism 310 as discussed in U.S. Pat. No. 6,802,475, which as discussed above, is fully incorporated herein by reference.

In certain embodiments, the anchor portion 331 of the actuation device 330 can be coupled to the eccentric cam 320 via a low friction arrangement. For example, the low friction arrangement can include a low friction surface, a rolling element bearing, a plain bearing, a spherical bearing, and/or a spherical rolling bearing. The low friction arrangement can facilitate the rotation of the anchor portion 331 of the actuation device 330 about the eccentric cam 320 when the eccentric cam moves the anchor portion 331 between the first, second, and third anchor positions. Additionally, the low friction arrangement 340 can facilitate the rotation of the anchor portion 331 of the actuation device 330 about the eccentric cam 320 when the actuation device 330 moves the first control surface 394 relative to the anchor portion 331.

Figure 6:
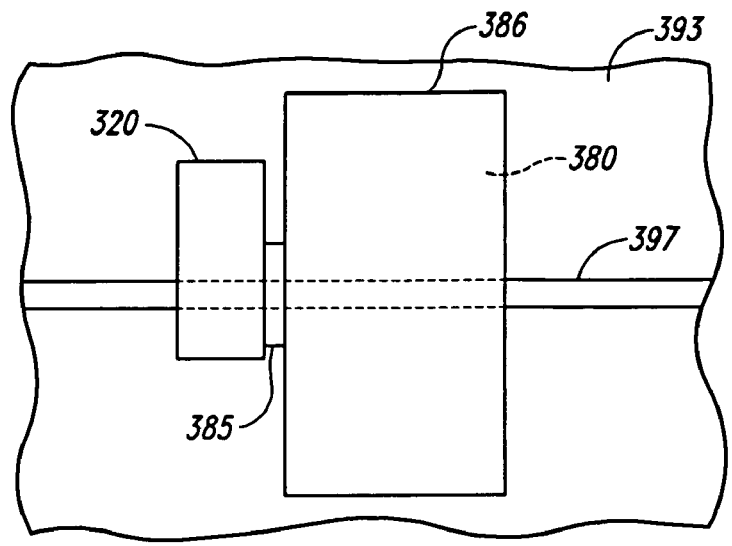
FIG. 6 is a partially schematic illustration of the gearing arrangement and the eccentric cam shown in FIG. 3.

FIG. 6 is a partially schematic rear view (e.g., looking from the trailing edge of the second control surface shown in FIG. 3) of the coupling element 397, the gear arrangement 380, and the eccentric cam 320 shown in FIG. 3. For the purpose of illustration, other elements shown in FIG. 3 have been removed. In the illustrated embodiment, the gearing arrangement 380 is at least partially contained in the housing 386, which can be coupled to a supporting structure 393 (e.g., an airfoil spar or other structural member). As discussed above, the coupling element 397 can impart rotational motion to the gearing arrangement 380. The gearing arrangement 380 can alter the rotational motion (e.g., by reducing or increasing the rotational speed and/or providing a mechanical advantage between the coupling element 397 and the eccentric cam 320) and in turn impart rotational motion to the eccentric cam 320 via a transmission member 385. Also as discussed above, in certain embodiments, the coupling element 397 can extend through the gearing arrangement 380 and/or the eccentric cam 320 and can be coupled to other elements (e.g., a drive unit, another gearing arrangement, and/or another eccentric cam).

Figure 7:
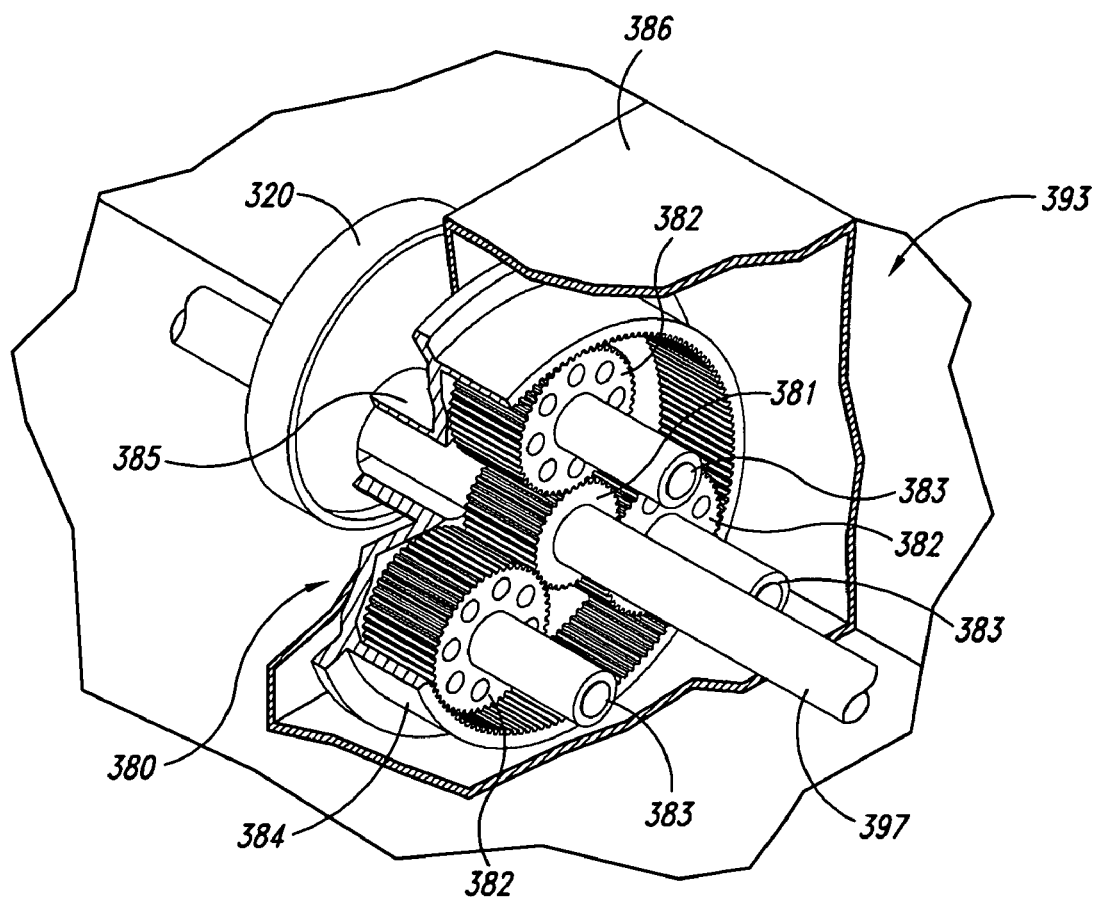
FIG. 7 is an isometric cut-away illustration of the gearing arrangement and eccentric cam shown in FIG. 6.

FIG. 7 is an isometric cut-away view of the coupling element 397, the gear arrangement 380, and the eccentric cam 320 shown in FIG. 6. In FIG. 7, the coupling element 397 is coupled to a sun gear 381. As the coupling element 397 rotates the sun gear 381, the sun gear 381 rotates planetary gears 382. In the illustrated embodiment, three planetary gears 382 are shown, but in other embodiments the gearing arrangement 380 can include more or fewer planetary gears 382. The planetary gears can be coupled to the housing 386 by supports 383 and configured to rotate about the supports 383. The planetary gears 382 can be operatively coupled to a ring gear 384 so that when the coupling element 397 rotates, the ring gear 384 rotates. The ring gear 384 can be coupled to one or more eccentric cams 320 via one or more transmission members 385 so that the eccentric cam(s) 384 rotate with the ring gear 384. As discussed above, the gearing arrangement 380 can be configured so that the rotational motion between the coupling element 397 and the eccentric cam 320 is altered. For example, in certain embodiments the gearing arrangement 380 can be configured such that when the coupling element 397 rotates at 600 RPM, the eccentric cam 320 rotates at 0.5 RPM.

Other gearing arrangements 380 can have other arrangements. For example, the gearing arrangement can be offset from the eccentric cam 320 so that the coupling element 397 extends through the gearing arrangement 380, but does not extend through the eccentric cam 320. In certain embodiments, the coupling element 397 can terminate at the gearing arrangement 380. In other embodiments, the eccentric cam 320 can be coupled directly to the gearing arrangement 380 without a transmission member 385 (e.g., the gearing arrangement 380 is internal to the eccentric cam 320). In still other embodiments, the eccentric cam 320 is coupled to the drive mechanism without a gearing arrangement 380, or the gearing arrangement 380 is coupled to the drive mechanism without a coupling element 397. In still other embodiments, non-rotational motion is imparted to the gearing arrangement 380 and the gearing arrangement 380 converts the non-rotational motion into rotational motion for rotating the eccentric cam 320.

Figure 8:
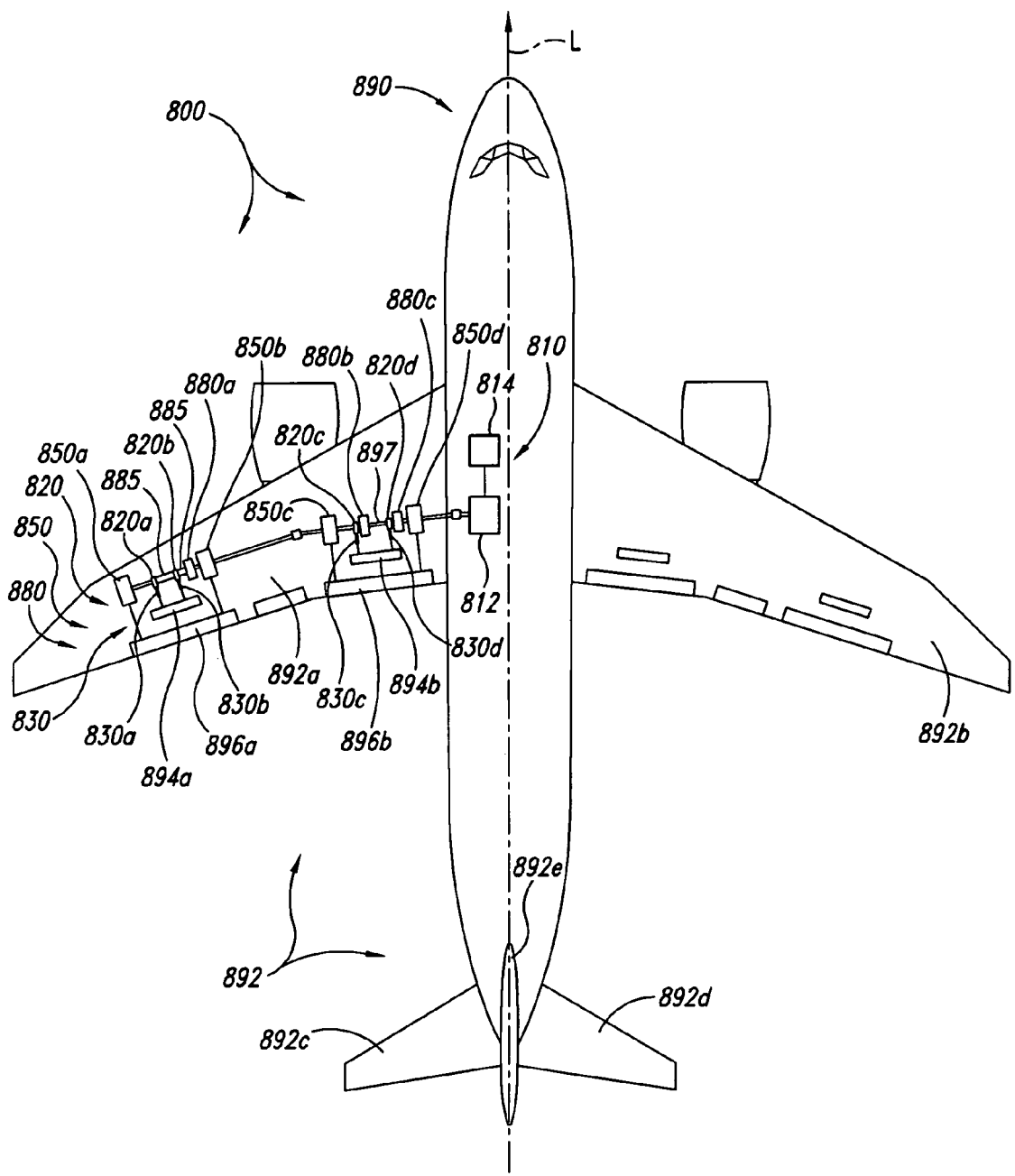
FIG. 8 is a partially schematic illustration of a positioning system that includes a vehicle in accordance with various embodiments of the invention.

FIG. 8 is a partially schematic illustration of a positioning system 800 that includes a vehicle 890 (e.g., an aircraft) with multiple eccentric cams 820 coupled to an actuation device 830. In FIG. 8, a drive mechanism 810 includes a power source 814 and a motion device 812 for converting power from the power source 814 into motion. For example, in certain embodiments the power source 814 can include a hydraulic pump and the motion device 812 can include a hydraulic motor or a hydraulic actuator. In other embodiments, the drive mechanism 810 can include other types of motion devices, including one or more electric, hydraulic, mechanical, and/or pneumatic motion devices 812. In the illustrated embodiment, the drive mechanism 810 is located proximate to the longitudinal axis L of the vehicle 890 (e.g., in the fuselage of an aircraft). In other embodiments, at least a portion of the drive mechanism 810 is located in another portion of the vehicle (e.g., in an airfoil section). In still other embodiments, the drive mechanism receives power from another source and does not include a power source 814.

In the illustrated embodiment, the drive mechanism 810 is coupled to rotate a coupling element 897. The coupling element 897 can include one or more portions and can be coupled to multiple elements and/or devices. In the illustrated embodiment, the coupling element 897 is coupled to three gearing arrangements 880 shown as a first gearing arrangement 880a, a second gearing arrangement 880b, and a third gearing arrangement 880c. In other embodiments, the positioning system 800 can include more or fewer gearing arrangements 880.

In FIG. 8, the first gearing arrangement 880a is coupled to a first eccentric cam 820a and a second eccentric cam 820b via a transmission member 885. In the illustrated embodiment, the transmission member 885 extends through the second eccentric cam 820b to the first eccentric cam 820a. In other embodiments the first and second eccentric cams 820a, 820b can be coupled to the gearing arrangement 880a via multiple transmission members 885 and/or transmission member(s) 885 having multiple portions. The first eccentric cam 820a is coupled to an outboard first control surface 894a (e.g., an outboard spoiler) via a first actuation device 830a. Similarly, the second eccentric cam 820b is coupled to the outboard first control surface 894a via a second actuation device 830b. The first gearing mechanism moves the first and second eccentric cams 820a, 820b, which in turn moves the outboard first control surface 894a in a similar manner to that discussed above with reference to FIGS. 3-7.

In the illustrated embodiment, the coupling element 897 is coupled to four drive units 850, shown as first drive unit 850a, second drive unit 850b, third drive unit 850c, and fourth drive unit 850d. In response to rotation of the coupling element 897, the first and second drive units 850a, 850b are configured to move an outboard second control surface 896a (e.g., an outboard flap), which is longitudinally disposed from the outboard first control surface 894a. Accordingly, the first and second eccentric cams 820a, 820b can be used to move (e.g., droop) the outboard first control surface 894a when the outboard second control surface 896a is moved (e.g., extended).

In FIG. 8, the second gearing arrangement 880b is coupled to a third eccentric cam 820c and a third gearing arrangement 880c is coupled to a fourth eccentric cam 820d. The third eccentric cam 820c is coupled to an inboard first control surface 894b (e.g., an inboard spoiler) via a third actuation device 830c. Similarly, the fourth eccentric cam 820d is coupled to the inboard first control surface 894b via a fourth actuation device 830d. The second and third gearing mechanisms 880b, 880c move the third and fourth eccentric cams 820c, 820d, which in turn move the inboard first control surface 894b in a similar manner to that discussed above with reference to FIGS. 3-7.

In the illustrated embodiment, the inboard second control surface 896b (e.g., an inboard flap) is longitudinally disposed from the inboard first control surface 894b. The third and fourth drive units 850c, 850d are configured to move an inboard second control surface 896b in response to rotation of the coupling element 897. Accordingly, the third and fourth eccentric cams 820c, 820d can be used to move (e.g., droop) the inboard first control surface 894b when the inboard second control surface 896b is moved (e.g., extended). In certain embodiments where the coupling element is mechanically geared to the outboard and inboard second control surfaces 896a, 896b via the drive units 850 and to the eccentric cams 820, movement between the eccentric cams 820 is coordinated with movement of the outboard and inboard second control surfaces 896a, 896b.

In other embodiments, the positioning system 800 can have other arrangements. For example, in other embodiments the positioning system 800 can include multiple drive mechanisms 810, multiple coupling elements 897, and/or coupling elements 897 with multiple portions. As discussed above, in embodiments in which the eccentric cams 820 are mechanically geared to the outboard and inboard second control surfaces 896a, 896b (e.g., through various elements, components, devices, and/or mechanisms), movement of the eccentric cams 820 can be coordinated with the movement of the outboard and/or inboard second control surfaces 896a, 896b. In other embodiments, the positioning system 800 can include more, fewer, and/or different combinations of eccentric cam(s) 820, gearing arrangement(s) 880, actuation device(s) 830, drive unit(s) 850 and/or control surface(s). For example, in certain embodiments more or fewer eccentric cams 820 can be coupled to a control surface and/or more actuation devices 830 can be coupled to an eccentric cam 820. Although the first and second control surfaces in the illustrated embodiments are longitudinally disposed relative to each other, in other embodiments the first and second control surfaces are disposed in other directions. In still other embodiments, an actuation device 830 can be coupled to an element other than a control surface and/or the coupling element(s) 897 can be coupled to other elements or devices. In the illustrated embodiment, the vehicle 890 is shown as an aircraft with multiple airfoils 892 (e.g., first airfoil 892a, second airfoil 892b, third airfoil 892c, fourth airfoil 892d, and fifth airfoil 892e) and the eccentric cams 820 are shown coupled to the first airfoil 892a. In other embodiments, the positioning system 800 can include other types of vehicles 890, and/or eccentric cams 820 positioned on other airfoils 892 and/or positioned on other portions of the vehicle 890.

A feature of some of the embodiments described above is that an eccentric cam can be positioned to move an anchor portion of an actuation device, allowing the actuation device to be moved to various positions while retaining the ability to operate (e.g., move a control surface relative to the anchor portion). This feature can be particularly useful for spoiler droop systems. For example, one or more eccentric cams can be coupled to the same drive mechanism that drives a flap surface. The eccentric cam(s) can be coupled to anchor portion(s) of one or more actuation devices. The actuation device(s) can be coupled to one or more spoiler surfaces. As the drive mechanism extends the flap surface, the eccentric cam(s) can move the anchor portion(s) of the actuation device(s), causing the spoiler surface(s) to droop. As the flap surface is retracted, the eccentric cam(s) can un-droop the spoiler surface(s). An advantage of this feature is that the long, heavy, and complex interconnect links of the prior art can be eliminated, reducing production cost and operating cost as compared to an aircraft configured in accordance with FIGS. 1-2.

Another feature of embodiments discussed above is that the eccentric cam(s) can be placed at any point across the span of a wing. This feature can eliminate the need to have a droop mechanism (e.g., the interconnect links shown in FIGS. 1-2) located in the flap cove proximate to where a flap drive unit is coupled to the flap surface. An advantage of this feature is that airflow proximate to the cove area can be improved, improving overall aircraft performance. Additionally, because the eccentric cam(s) can be placed at any point across the span of a wing, the actuation device(s) can be placed at selected positions relative to the spoiler to provide a mechanical advantage in moving the spoiler. This feature can reduce the spoiler actuation requirements and/or structural requirements for reinforcing the spoiler. Additionally, this feature can reduce the wear and tear on the spoiler and the actuator. Accordingly, this feature can reduce manufacturing and/or maintenance costs.

From the foregoing, it will be appreciated that specific embodiments of the invention have been described herein for purposes of illustration, but that various modifications may be made without deviating from the invention. For example, aspects of the invention described in the context of particular embodiments may be combined or eliminated in other embodiments. For instance, although a flap system having a gapped extended position has been used to illustrate a second control surface in certain embodiments discussed above, in other embodiments the second control surface can include a flap system that has non-gapped extended positions, or another type of control surface. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

We claim:

1. A positioning system, comprising:
   an eccentric cam;
   a drive mechanism coupled to the eccentric cam to rotate the eccentric cam between a first cam position and a second cam position; and
   an actuation device having an anchor portion and a movable portion that is movable relative to the anchor portion, the anchor portion operatively coupled to the eccentric cam, the eccentric cam being positioned to move the anchor portion to a first anchor position when the eccentric cam is rotated to the first cam position and to move the anchor portion to a second anchor position when the eccentric cam is rotated to the second cam position, the ecentric cam being positioned to rotate within at least part of the anchor portion of the actuation device.

2. The system of claim 1, further comprising at least one of a coupling member and a gearing arrangement coupled between the eccentric cam and the drive mechanism.

3. The system of claim 1 wherein the eccentric cam is coupled to the drive mechanism via a coupling member, the coupling member passing through the eccentric cam.

4. The system of claim 1 wherein the drive mechanism includes at least one of an electric, a hydraulic, a mechanical, and a pneumatic motion device.

5. The system of claim 1 wherein the actuation device includes at least one of an electric, a hydraulic, a mechanical, and a pneumatic actuator.

6. The system of claim 1, further comprising a vehicle, the drive mechanism being coupled to a portion of the vehicle.

7. The system of claim 1 wherein the anchor portion of the actuation device is coupled to the eccentric cam via a low friction arrangement.

8. The system of claim 1, wherein the eccentric cam includes a first eccentric cam and the actuation device includes a first actuation device, and wherein the system further comprises:
   a second eccentric cam, the drive mechanism being coupled to the second eccentric cam to rotate the second eccentric cam between a first cam position and a second cam position; and
   a second actuation device having an anchor portion and a movable portion that is movable relative to the anchor portion, the anchor portion operatively coupled to the second eccentric cam, the second eccentric cam being positioned to move the anchor portion of the second actuator to a first anchor position when the second eccentric cam is rotated to the first cam position and to move the anchor portion of the second actuator to a second anchor position when the second eccentric cam is rotated to the second cam position.

9. The system of claim 1, further comprising a control surface coupled to the actuation device, the actuation device positioned to move the control surface between at least two positions relative to the anchor portion of the actuation device.

10. The system of claim 1, further comprising:
    a first control surface coupled to the actuation device; and
    a second control surface coupled to the drive mechanism, the drive mechanism being arranged to move the second control surface while rotating the eccentric cam between the first cam position and the second cam position.

11. The system of claim 1, further comprising:
    a first control surface coupled to the actuation device; and
    a second control surface longitudinally disposed from the first control surface, the second control surface being coupled to the drive mechanism, the drive mechanism being arranged to move the second control surface while rotating the eccentric cam between the first cam position and the second cam position.

12. The system of claim 1 wherein:
    the drive mechanism is coupled to the eccentric cam to rotate the eccentric cam among at least the first cam position, the second cam position, and a third cam position; and
    the eccentric cam is positioned to move the anchor portion of the actuation device to at least the first anchor position when the eccentric cam is rotated to the first cam position, the second anchor position when the eccentric cam is rotated to the second cam position, and a third anchor position when the eccentric cam is rotated to the third cam position.

13. The system of claim 1 wherein the actuation device includes a linear actuation device, and wherein the system further comprises:
    an airfoil coupled to an aircraft;
    a coupling member coupled to the drive mechanism;
    a gearing arrangement coupled to the coupling member so that the drive mechanism rotates the eccentric cam via the coupling member and the gearing arrangement;
    a spoiler surface coupled to the airfoil and the actuation device, the actuation device being positioned relative to the spoiler surface so that when the anchor portion of the actuation device is moved to the first anchor position the spoiler surface is moved to a first spoiler position and when the anchor portion of the actuation device is moved to the second anchor position the spoiler surface is moved to a second spoiler position; and
    a flap surface coupled to the airfoil and the drive mechanism, the drive mechanism being positioned to move the flap surface to a first flap position when the anchor portion of the actuation device is moved to the first anchor position and to a second flap position when the anchor portion of the actuation device is moved to the second anchor position.

14. A method for making a positioning system comprising:
    coupling a drive mechanism to an eccentric cam to rotate the eccentric cam between a first cam position and a second cam position; and
    coupling an anchor portion of an actuation device to the eccentric cam, the eccentric cam being positioned to move the anchor portion to a first anchor position when the eccentric cam is rotated to the first cam position and to move the anchor portion to a second anchor position when the eccentric cam is rotated to the second cam position, the actuation device having a movable portion that is movable relative to the anchor portion, the ecentric cam being positioned to rotate within at least part of the anchor portion of the actuation device.

15. The method of claim 14, further comprising coupling the drive mechanism to a vehicle.

16. The method of claim 14 wherein coupling a drive mechanism to an eccentric cam includes coupling a drive mechanism to an eccentric cam via at least one of a coupling member and a gearing arrangement.

17. The method of claim 14, wherein the method further comprises coupling the actuation device to a control surface to move the control surface between at least two positions relative to the anchor point.

18. The method of claim 14, further comprising:
coupling the actuation device to a first control surface; and
coupling the drive mechanism to a second control surface to move the second control surface while the eccentric cam is rotated between the first cam position and the second cam position.

19. The method of claim 14 wherein coupling a drive mechanism to an eccentric cam includes coupling a drive mechanism to an eccentric cam via a coupling member and a gearing arrangement, and wherein the actuation device includes a linear actuation device, and further wherein the method further comprises:
coupling an airfoil to an aircraft;
coupling a spoiler surface to the airfoil and the actuation device so that when the eccentric cam moves the anchor point to the first anchor position the spoiler surface moves to a first spoiler position and when the eccentric cam moves the anchor point to the second anchor position the spoiler surface moves to a second spoiler position; and
coupling the drive mechanism to a flap surface so that when the drive mechanism moves the flap surface to a first flap position the drive mechanism rotates the eccentric cam to the first cam position and when the drive mechanism moves the flap surface to a second flap position the drive mechanism rotates the eccentric cam to the second cam position.

20. A method for positioning an actuation device, comprising:
rotating an eccentric cam with a drive mechanism between a first cam position and a second cam position, an anchor portion of the actuation device being coupled to the eccentric cam so that the anchor portion of the actuation device moves to a first anchor position when the eccentric cam is rotated to the first cam position and the anchor portion of the actuation device moves to a second anchor position when the eccentric cam is rotated to the second cam position, the eccentric cam being positioned to rotate within at least part of the anchor portion of the actuation device; and
moving a movable portion of the actuation device relative to the anchor portion.

21. The method of claim 20 wherein rotating an eccentric cam with a drive mechanism includes rotating an eccentric cam with a drive mechanism that is coupled to a vehicle.

22. The method of claim 20 wherein an anchor portion of an actuation device being coupled to the eccentric cam includes an anchor portion of an actuation device being coupled to the eccentric cam and the actuation device being coupled to a control surface to move the control surface between at least two positions relative to the anchor portion.

23. The method of claim 20 wherein rotating an eccentric cam with a drive mechanism includes rotating an eccentric cam with a drive mechanism via at least one of a coupling member and a gearing arrangement.

24. The method of claim 20 wherein:
an anchor portion of an actuation device being coupled to the eccentric cam includes an anchor portion of an actuation device being coupled to the eccentric cam and the actuation device being coupled to a first control surface; and
rotating an eccentric cam with a drive mechanism includes rotating an eccentric cam with a drive mechanism that is coupled to a second control surface to move the second control surface while the eccentric cam is rotated between the first cam position and the second cam position.

25. The method of claim 20 wherein:
rotating an eccentric cam with a drive mechanism includes rotating an eccentric cam with a drive mechanism via a coupling member and a gearing arrangement, and
an anchor portion of an actuation device being coupled to the eccentric cam includes an anchor portion of an actuation device being coupled to the eccentric cam and the actuation device being coupled to a spoiler surface, the drive mechanism being coupled to a flap surface to move the flap surface while the eccentric cam is rotated between the first cam position and the second cam position.

* * * * *

UNITED STATES PATENT AND TRADEMARK OFFICE
CERTIFICATE OF CORRECTION

PATENT NO. : 7,309,043 B2
APPLICATION NO. : 11/116905
DATED : December 18, 2007
INVENTOR(S) : Good et al.

It is certified that error appears in the above-identified patent and that said Letters Patent is hereby corrected as shown below:

On the title page:
On page 3, in item (56), under "U.S. Patents Documents", in column 2, line 26, after "Urnes" insert --, Sr. et al. --.

On page 3, in item (56), under "U.S. Patents Documents", in column 2, line 55, delete "Feyereisien" and insert -- Feyereisen --, therefor.

On page 4, in item (56), under "Other Publications", in column 2, line 31, delete "Aeornautics" and insert -- Aeronautics --, therefor.

On page 4, in item (56), under "Other Publications", in column 2, line 34, delete "shpe" and insert -- shape --, therefor.

On page 4, in item (56), under "Other Publications", in column 2, line 48, delete "http:wn" and insert -- http://wn --, therefor.

In column 9, line 34, in Claim 1, delete "ecentric" and insert -- eccentric --, therefor.

In column 11, line 7, in Claim 14, delete "ecentric" and insert -- eccentric --, therefor.

In column 12, line 6, in Claim 20, delete "ecentric" and insert -- eccentric --, therefor.

Signed and Sealed this

Twenty-ninth Day of July, 2008

JON W. DUDAS
*Director of the United States Patent and Trademark Office*